United States Patent [19]

Tyagi et al.

[11] Patent Number: 5,102,762
[45] Date of Patent: Apr. 7, 1992

[54] POLYESTERS AND TONERS MADE THEREWITH WHICH ABSORB ULTRAVIOLET LIGHT

[75] Inventors: Dinesh Tyagi, Fairport; John C. Wilson, Rochester, both of N.Y.

[73] Assignee: Eastman Kodak Company, Rochester, N.Y.

[21] Appl. No.: 645,529

[22] Filed: Jan. 24, 1991

Related U.S. Application Data

[63] Continuation-in-part of Ser. No. 434,377, Nov. 13, 1989, Pat. No. 5,049,646.

[51] Int. Cl.⁵ .............................................. G03G 9/087
[52] U.S. Cl. ................................. 430/109; 430/106.6
[58] Field of Search ................. 430/106, 106.6, 107, 430/109, 110

[56] References Cited

U.S. PATENT DOCUMENTS 5,032,499  7/1991  Kahno et al. ...................... 430/203
5,049,646  9/1991  Tyagi et al. ........................ 528/292

Primary Examiner—John Goodrow
Attorney, Agent, or Firm—Dressler, Goldsmith, Shore, Sutker & Milnamow, Ltd.

[57] ABSTRACT

An ultraviolet light absorbing polyester resin and toner particles incorporating such polymer are provided. The toner particles are particularly useful in photolithographic applications wherein ultraviolet light is used for making printing plates from color separation transparencies which contain imaged areas defined by the toner particles. The toner particles can be prepared, if desired, in finely divided form capable of forming high resolution electrographic images, and the toner particles can be used in dry or liquid developer formulation. The toner particles are heat fusible preferably at low temperatures, resist toner offset, and have good cohesivity.

19 Claims, No Drawings

POLYESTERS AND TONERS MADE THEREWITH WHICH ABSORB ULTRAVIOLET LIGHT

CROSS REFERENCE TO RELATED APPLICATION

This invention is a continuation-in-part of U.S. patent application Ser. No. 07/434,377, filed Nov. 13, 1989 entitled "POLYESTERS AND TONERS MADE THEREWITH WHICH ABSORB ULTRAVIOLET LIGHT" now U.S. Pat. No. 5,049,646.

FIELD OF THE INVENTION

This invention lies in the field of ultraviolet light absorbing polyester polymers and toner compositions containing such polymers.

BACKGROUND OF THE INVENTION

Various ultraviolet light absorbing thermoplastic polyesters are known in the art for screening out ultraviolet radiation. See, for example, U.S. Pat. Nos. 4,338,247; 4,340,718; 4,617,373; 4,617,374; 4,661,566; and 4,707,537. These polyesters are used for the protection of food and beverage products packaged in containers and the improvement of light fastness in polyester fibers.

In such fields as lithographic printing plate manufacture, printed circuit board manufacture, and the like, it has not heretofore been possible to use electrophotographic imaging and development techniques based on toner powders because ultraviolet light absorbing toner powders, particularly toner powders with high resolution capabilities using a relatively small quantity of toner, have not been available.

SUMMARY OF THE INVENTION

This invention provides novel amorphous thermoplastic polyesters wherein, as an integral part of the polymer backbone or chain, ultraviolet (UV) light absorbing residues are incorporated. These residues are derived from certain methine compounds which are reacted with the polymer precursors, i.e., monomers. These methine compounds are characterized by the generic formula:

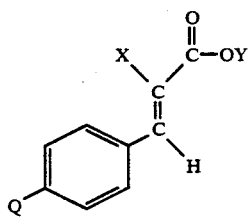
(1)

wherein:
Y is a lower alkyl group;
X is selected from the group consisting of

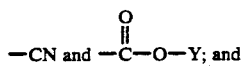

Q is selected from the group consisting of —NH$_2$, —NHY, —N(Y)$_2$ and

(2)

These polyesters have an inherent viscosity (i.v.) in the range of about 0.05 to about 0.80 in methylene chloride solution at a concentration of 0.25 grams of said polymer per 100 milliliters of said solution. As presently preferred, these polymers have a branched chain structure.

The total quantity of methine compound residues present in the polyesters of this invention is in the range of about 0.10/99.9 to about 100.0/0.0 mole ratio on a total acid or hydroxy monomer basis, and, preferably, about 0.50/99.5 to about 50.0/50.0 mole ratio. One skilled in the art will appreciate that, except where otherwise indicated, the mole ratios set forth herein apply to difunctional dyes. For example, if monofunctional dyes are utilized, the mole ratios will be in the range of about 0.1/99.95 to about 100.0/0.

Presently preferred polyesters of this invention contain both phthalic acid residues of the formula:

(3)

where $\phi$ is a phenylene nucleus that is substituted in the 1 and 2-positions, the 1 and 3-positions, or the 1 and 4-positions, and polyol residues of the formula

(4)

where R is a lower alkylene group, a di(lower alkylene) substituted cycloalkylene group, a difunctional cycloalkylene group, a lower alkylene group containing at least one incorporated oxo atom (preferably —CH$_2$—CH$_2$—O—CH$_2$—CH$_2$—), or a lower alkylene group containing at least one pendant oxy (—O—) atom

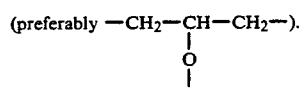

A polyester polymer of this invention has a glass transition temperature (T$_g$) in the range of about 50° to about 120° C., preferably about 50° to about 70° C. Such values are desirable in toner particles made from polymers.

In another aspect, this invention provides novel toner particles which are capable of absorbing ultraviolet light, such as the light used for example, in phototypesetting and in preparation of color separations for plate making in lithography. Toner particles incorporating the polyester polymers of this invention can, if desired, be formulated with various additives, such as, for example, carrier particles (magnetic or nonmagnetic), carrier liquids, low surface energy liquids, colorants, charge control agents, and the like.

Particularly when finely divided toner particles comprised of polyester polymers of this invention are used, dry or liquid developers are achievable which are capable of forming high resolution visible images from electrostatically formed, or photoconductively formed, latent images using relatively small amounts of toner. Toner compositions of the present invention generally have good cohesivity and resist toner offset. Preferably they are heat fusible at relatively low temperatures (i.e., at temperatures below about 175° C.).

Toner particles (or powders) made with such polymers are readily fusible to sheet members, such as a transparent plastic film, or the like.

Various other features, advantages, aims, embodiments and the like of this invention will be apparent to those skilled in the art from the present specification and appended claims.

DETAILED DESCRIPTION

As used herein, the term "lower" before a group, such as "alkyl", or "alkylene", has reference to a group which contains less than 7 carbon atoms. A "lower alkyl" or "lower alkylene" group can be a branched or straight chain.

The polyesters of this invention are prepared by reacting the usual types of polyester monomers with methine compounds of Formula (1).

Monomers useful in preparing polyesters of this invention include any of those known to be useful in general to prepare polyester binders for toner particles. Some specific examples of such monomers are: 1,4-cyclohexanediol; 1,4-cyclohexanedimethanol; 1,4-cyclohexanediethanol; 1,4-bis(2-hydroxyethoxy)cyclohexane; 1,4-benzenedimethanol; 1,4-benzenediethanol; norbornylene glycol; decahydro-2,6-naphthalenedimethanol; glycerol; bisphenol A; ethylene glycol; diethylene glycol; triethylene glycol; 1,2-propanediol; 1,3-propanediol; 1,4-butanediol; 2,3-butanediol; 1,5-pentanediol; neopentyl glycol; 1,6-hexanediol; 1,7-heptanediol; 1,8-octanediol; 1,9-nonanediol; 1,10-decanediol; 1,12-dodecanediol; pentaerythritol; 2,2,4-trimethyl-1,6-hexanediol; 4-oxa-2,6-heptanediol; succinic acid; sebacic acid; 2-methyladipic acid; diglycolic acid; thiodiglycolic acid; fumaric acid; cyclohexane-1,3-dicarboxylic acid; cyclohexane-1,4-dicarboxylic acid; cyclopentane-1,3-dicarboxylic acid; 2,5-norbornanedicarboxylic acid; phthalic acid; isophthalic acid; terephthalic acid; 2-butylisophthalic acid; 2,6-naphthalenedicarboxylic acid; 1,4-naphthalenedicarboxylic acid; 1,5-naphthalenedicarboxylic acid; 4,4'-sulfonyldibenzoic acid; 4,4'-oxydibenzoic acid; binaphthyldicarboxylic acid; 9,10-triptycenedicarboxylic acid; and the anhydrides and lower alkyl esters of the acids mentioned.

Polyfunctional compounds having three or more carboxyl groups, and three or more hydroxyl groups, can also be employed. Various polyols or polyacids are conventionally used to create branching in the polyester chain, such as triols, tetraols, tricarboxylic acids or functional equivalents, and the like. Examples of such branching agents include pentaerythritol, 1,3,5-trihydroxyl pentane, 1,5-dihyroxy-3-ethyl-3-(2-hydroxyethyl) pentane, trimethylolpropane, trimellitic anhydride, pyromellitic dianhydride, and the like. A presently preferred polyol is glycerol. Preferably up to about a 10/85 mole ratio of a starting monomer mixture based upon the total acid or hydroxy monomers is comprised of at least one polyol or polyacid containing three functional hydroxyl or carboxyl groups per molecule or a 10/80 mole ratio for tetrafunctional molecules.

The polyesterification reaction mixture also includes one or more ultraviolet light absorbing dyes of Formula (1) in an amount as above indicated. Preferably in Formula (1), Y is methyl or ethyl, and Q is —N(CH$_3$)$_2$ or

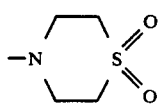

Presently preferred compounds of Formula (1) are represented by the following formula:

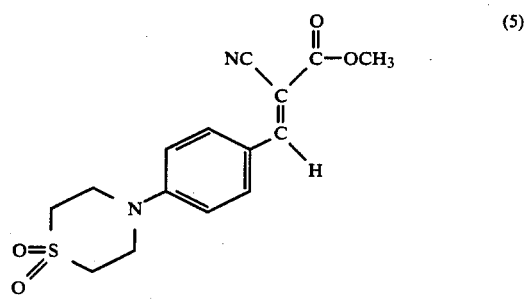

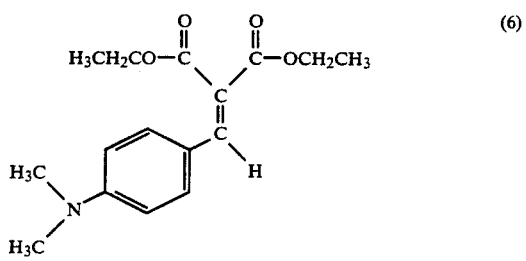

A generic formula for a class of dye containing polyesters suitable for use in the practice of the present invention is as follows:

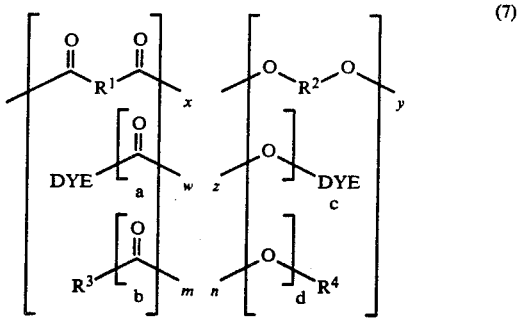

wherein:
R$^1$ and R$^2$ are aromatic or aliphatic and more than one R$^1$ and R$^2$ may be present in the same structure;
Dye is any ultraviolet light absorbing moiety derived from a Formula (1) compound;
R$^3$ and R$^4$ are aromatic or aliphatic;
a, b, c and d may each be an integer of 1 through 6; and
w, x, y, z, m and n are each a mole ratio of acid or hydroxy segments.

Each of x, y and w and/or z must always have value equal to or greater than 0.

A generic formula for a preferred class of dye containing polyesters suitable for use in the practice of this invention is as follows:

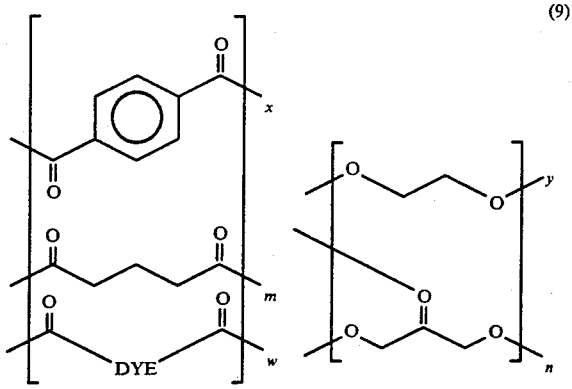

(9)

where:
x, m, w, y and n are each as defined above; and
DYE is a residue from a compound of Formula (1) wherein X as defined in Formula (1) is:

—C—OY.

Variations in the relative amounts of each of the respective monomer residues are possible; however, such variations need to be achieved without adversely affecting the physical properties of the polymer.

A dye residue derived from Formula (1) is usually in the acid segment (or residue) of a polymer. Although herein the dye has been illustrated as difunctional, it will be appreciated that in a polyester the functionality of a dye can also include mono-, tri-, or tetra- species. The presence of a branching agent is optional and will affect the mole ratios specified herein.

The polyesters of this invention are conveniently prepared by any of the known polycondensation techniques, e.g., solution polycondensation or catalyzed melt-phase polycondensation; for example, by the transesterification of dimethyl terephthalate, dimethylglutarate and functional dye with 1,2-propanediol and glycerol. The polymers can be prepared by known two-stage polyesterification procedures, such as described in U.S. Pat. No. 4,140,644 and U.S. Pat. No. 4,217,400, the latter being especially directed to the control of branching in polyesterification. The dye, glycols and carboxylic acids (or their esterification equivalents) are heated with the branching agent, such as a triol or triacid (or their functional equivalents), and a transesterification catalyst in an inert atmosphere. Suitable temperatures are in the range of about 190° to about 280° C., and preferably about 200° to about 260° C. Thereafter, a vacuum is applied, and heating is continued, for example, at a temperature in the range of about 220° to about 240° C., to build up the molecular weight.

If desired, the degree of polyesterification can be monitored by measuring the inherent viscosity (i.v.) of samples taken from the reaction periodically.

In general, for use in toner particles, the i.v. of a polyester of this invention is chosen to be in the range of about 0.05 to about 0.80 measured in methylene chloride solution at a concentration of 0.25 grams of such polymer per 100 milliliters of such solution. Presently preferred polymers have a branched chain structure. Preferably the i.v. of such a polymer is in the range from about 0.10 to about 0.60.

Similarly for use in toner particles, a polyester of this invention has a fusing point in the range of about 65° to about 200° C., and a $T_g$ in the range of about 50° to about 120° C.

The term "fusing point" as used herein refers to the temperature at which acceptable adhesion between toner particles and the receiver is achieved without hot off-set problems with the fusing roller.

The term "glass transition temperature" ($T_g$) as used herein refers to the temperature at which a polymer material changes from a glassy polymer to a rubbery polymer. This temperature ($T_g$) can be measured by differential thermal analysis as disclosed in Techniques and Methods of Polymer Evaluation, Vol. 1 Marcel Dekker, Inc., N.Y., 1966.

After reaching a desired inherent viscosity and fusing point, the polyester resin is cooled and isolated. Characteristically the polyester resin is thermoplastic and amorphous.

When a difunctional dye is utilized, one presently preferred subclass of polyesters of the invention comprises residues derived from the polyesterification of a polymerizable monomer composition comprising:

about 0.0/100.0 to about 99.9/0.1 mole ratio of dimethyl terephthalate based on the total acid monomers;

about 10.0/90.0 to about 100.0/0.0 mole ratio of 1,2-propane diol based on the total hydroxy monomers;

about 0.0/100.0 to about 90.0/10.0 mole ratio of additional glycol based on the total hydroxy monomers; and about 0.10/99.9 to about 100.0/0.0 mole ratio of at least one methine compound of Formula (1) above based on the total acid monomers.

Another preferred subclass comprises residues derived from the polyesterification of the above polymerizable monomer composition which additionally contains:

about 5.0/95.0 to about 25.0/75.0 mole ratio of dimethylglutarate based on the total acid monomers; and about 1.0/98.5 to about 10.0/85.0 mole ratio of glycerol based on the total hydroxy monomers.

A polyester of the present invention, and toner particles of the present invention formed therefrom, characteristically contain about 0.10/99.9 to about 100.0/0.0 mole ratio of ultraviolet light absorbing residues incorporated as an integral part of the polymer backbone structure based on total acid or hydroxy monomer residues of polymerized compounds present in such polyester and preferably about 0.50/99.5 to about 50.0/50.0 mole ratio. These ultraviolet light absorbing residues are derived from a methine compound of Formula (1) above.

Toner particles can be prepared from polyesters of the present invention by any convenient procedure.

So called dry or particulate toner powders can be prepared by a variety of techniques. In one process, a water-immiscible polymerizable liquid monomer, colorant (i.e., pigment or dye) and ultraviolet dye containing polyester are dispersed as droplets in an aqueous medium containing a colloidally sized suspending agent. The monomer is polymerized to form solid colorant containing polymeric particles that are separated and dried. The process is useful in making very small particle size toner powders (under about 10 microns) that can be employed in making high resolution developed toned images. The limited coalescence process is described, for example, in U.S. Pat. No. 3,615,972.

Another example is an evaporation limited coalescence process, where the stabilizer used is also a colloidal silica, or the like, and where the suspended small droplets comprise a solution of polymer in a non-aqueous, water immiscible solvent liquid. The polymer may consist of either ultraviolet dye containing polyester or mixture of a toner binder with an ultraviolet dye containing polyester. The solvent is removed and the particles are separated, washed and dried. Such a process is disclosed in U.S. Pat. No. 4,833,060.

A further example is a limited coalescence polymerization or evaporation process wherein the stabilizer used is an emulsion polymerized aqueous latex of certain copolymers containing oleophilic and hydrophilic combined monomers as is disclosed in published European Patent Application No. 0 334 126. The toner polymer composition would remain the same as described immediately above.

In one preferred procedure, after cooling and solidifying, a solid polyester is crushed and then coarsely ground in a mill. Thereafter, the coarsely ground polymer is further pulverized or ground to produce a toner particle size, or size range, as desired. One suitable fine grinding means is a fluid energy or air jet mill, such as described in U.S. Pat. No. 4,089,472, although other methods and apparatus for finely grinding solid resins can also be used. Particles can be classified by conventional procedures if desired. The polyester resins of the present invention can also be dispersed in polymeric binders such as styrene butylacrylate, styrene butymethacrylate and styrene butadiene copolymers.

Then, depending upon whether a liquid or dry developer is desired, the resulting particles are optionally mixed in appropriate ratios with one or more additives, such as a carrier liquid when a liquid developer is desired, or wi&:h solid, finely divided additive particles when a dry developer is desired. Additives can either be admixed or blended with preformed polymer particles, or intermixed into the polymer matrix of individual particles by, for example, using conventional heated compounding rolls, or the like. Examples of additives which can be melt blended with polyester particles include colorants (dyes or pigments), charge control agents, and the like. The particulate polymer can be used as a single component dry toner powder developer without the need for such additional carriers, if desired. The polyester resins of the present invention can also be dispersed in polymeric binders such as styrene butylacrylate, styrene butylmethacrylate and styrene butadiene copolymers.

The polyester resins of this invention are preferably sufficiently brittle to permit their being ground to very small particle size, and such brittleness facilitates the crushing and intermediate grinding procedures that usually precede a final grinding operation.

In general, toner particles of this invention can fall in the size range of about 0.01 to about 100 microns in average diameter. When intended for use in the powder cloud development process described in U.S. Pat. No. 2,691,345, the particle size can be of the order of about 0.01 micron in average diameter. Toner particles in the size range of about 1 to about 30 microns in average diameter can be employed in either liquid or dry developers, and such a particle size is presently preferred because toner particles in this size range are commonly used in most electrostatic image development techniques. Liquid developer compositions incorporating toner particles of volume average particle size less than about 1 micron and dry toner compositions of volume average particle size less than about 15 microns are believed to be especially useful for high resolution image development. Toner particles of substantially larger particle size are also useful in applications where ultraviolet light screening is desired.

In a particulate toner composition, the polyester polymer is the major component of this invention. It comprises more than about 50 weight percent of the total toner particle composition weight, and preferably such polymer comprises about 75 to about 98 weight percent thereof. Colorants and charge control agents usually constitute the balance of the composition.

The colorant can be selected from among a wide variety or range of dyes and/or pigments. Useful colorants (including black) are described in many patents. See, for example, U.S. Pat. Nos. 4,140,644; 4,416,965; 4,414,152; and 2,229,513. The concentration of colorant in a toner composition can vary over a wide range; for example, such can be in the range of about 0.5 to about 20 weight percent, with a range of about 1 to about 6 weight percent being presently preferred, on a total composition basis.

The charge control agents can be an ionic compound, such as an ammonium or phosphonium salt, or the like. Examples of suitable charge control agents are disclosed in U.S. Pat. Nos. 3,895,935; 4,079,014; 4,323,634; 4,394,430; 4,496,643 and in British Patent Nos. 1,501,065 and 1,420,839. Only a small concentration of charge control agent normally is used in the toner composition, such as in the range of about 0.05 to about 5 weight percent, and preferably about 0.2 to about 2.0 weight percent on a total composition basis.

Dry toner compositions of this invention can optionally incorporate a small quantity of low surface energy liquid in combination with toner particles comprised of the polyester polymer, such as described in U.S. Pat. No. 4,517,272. presently preferred such liquids are silicone oils and poly dimethyl siloxane copolymers. Examples thereof include silicone glycol copolymer liquids, alkylaryl silicone liquids, chlorophenylmethyl silicone liquids, dimethyl silicone liquids, fluorosilane liquids, and the like, such as are available commercially from the Dow Corning Company. Other such liquids include polyvinylidene fluoride liquids, polymonochlorotrifluoroethylene liquids, hexafluoropropylenevinylidene fluoride copolymers, perfluoroalkyl polyethers (such as are available commercially from the duPont Company and Montecatini-Edison), fluoroalkyl esters, block copolymers of dimethyl siloxane with various materials, such as bisphenol A, tetramethylspirobi(indan)diol, and the like. When employed, the amount of such a liquid is in the range of about 0.5 to about 10 weight percent based on total weight of a toner composition.

Liquid developers are liquid dispersions comprised of toner particles of this invention prepared as above described herein that are dispersed in an electrically insulating carrier liquid. Examples of optional additives which can be present in a liquid developer include colorants, charge control agents, stabilizing agents, waxes, and the like. Examples of such additives and techniques for their incorporation into developers are described, for example, in U.S. Pat. Nos. 3,849,165; 4,229,513; 3,788,995; 4,415,299; and 4,659,640.

One method for preparing a liquid developer dispersion involves milling in a solvent such as Isopar G ™ (a brand of high purity mixed isoparaffinic materials marketed by Exxon Corp.) A quantity of the polyester resin is optionally first melt compounded on a two roll mill with additives such as colorants and the like. The resulting melt concentrate is then pulverized in a Wiley Mill ™ (a brand of pulverizer marketed by Arthur H. Thomas Company, Philadelphia, PA), or the like, until an average particle size less than about 1 mm is produced. The resulting pulverized polymer particles are then ballmilled preferably with dispersing aids, such as described, for example, in U.S. Pat. No. 4,659,640, to form a concentrate of toner particles having a volume average particle size that is preferably less than about 1 micron. A liquid developer is then made by dispersing the toner particle concentrate in a volatile carrier liquid.

The carrier liquid is characterized by a low dielectric constant that is preferably less than about 2.5, and by a high electrical resistance that is preferably greater than about $10^{10}$ ohm-cm volume resistivity. Examples of suitable carrier liquids include halogenated hydrocarbons, such as trichloromonofluoromethane, and the like; hydrocarbons, such as isoparaffins having a boiling point in the range of about 145° to about 185° C., such as Isopar G ™, and the like; cyclic hydrocarbons, such as cyclohexane, and the like; odorless mineral spirits; hydrocarbons, such as octane; and the like.

On a 100 weight percent total basis, a liquid composition can contain about 5 to about 50 weight percent of solids with the balance up to 100 weight percent being carrier liquid.

The dry toner and liquid developer compositions of this invention can be used if desired in electrophotographic processes and in the development of images in processes not requiring the use of light sensitive materials, such as dielectric recording materials. These compositions are particularly useful for developing charge patterns on photoconductive transparencies or receiver sheets, such as are useful in the preparation of color separations used for making lithographic printing plates in multicolor printing, whereon an electrostatic charge pattern is produced that is representative of one color of a multicolor original image, such as a color photograph, or the like.

The dry developer compositions of this invention are useful in all known methods of dry development, including, for example, magnetic brush development, cascade development, powder cloud development, and the like. When used in the magnetic brush method which employs a so-called two component developer composition, the toner particle compositions of this invention are blended with magnetic carrier particles. The magnetic particles are ferromagnetic materials, such as iron, iron alloys, ferrites, and the like which can be thinly or partially coated with a small amount, such as about one part per hundred of a polymer. Such a polymer can be, for example, a fluorinated hydrocarbon resin, or the like, and is used to provide desired triboelectric properties. Usually magnetic carrier particles are of a somewhat larger particle size than the toner particles, although, in some developers, carrier particles can be about the same size as the toner particles. Examples of suitable carriers are disclosed in U.S. Pat. Nos. 3,795,617; 3,795,618; 4,076,857; and 4,546,060.

The invention is illustrated by the following examples:

EXAMPLE 1

A mixture of 83.74 g (0.43125 mol) of dimethyl terephthalate, 10.41 g (0.065 mol) of dimethyl glutarate, 1.093 g (0.00375 mol) of the methine compound of Formula (6) (above), 2.30 g (0.025 mol) of glycerol and 53.27 g (0.70 mol) of 1,2-propanediol was placed in a polymer flask with catalytic amounts of $Zn(OAc)_2 \cdot 2H_2O$ and $Sb_2O_3$. The flask was fitted with a Vigreaux-Claisen column, nitrogen inlet tube and the flask side arm was sealed. The mixture was then heated in a 220° C. bath for 2 hours and subsequently at 240° C. for 1 hour with $N_2$ bubbling through the melt. The column was then removed and the flask side arm was opened. Heating at 240° C. with $N_2$ bubbling through the melt was continued for another 50 minutes. The $N_2$ inlet tube was replaced with a metal blade stirrer and the system was slowly placed on reduced pressure (0.25 mm) with stirring. After 45 minutes, the polymer was cooled and isolated. The inherent viscosity was determined to be 0.17 in methylene chloride.

The polymer contained the following moieties.

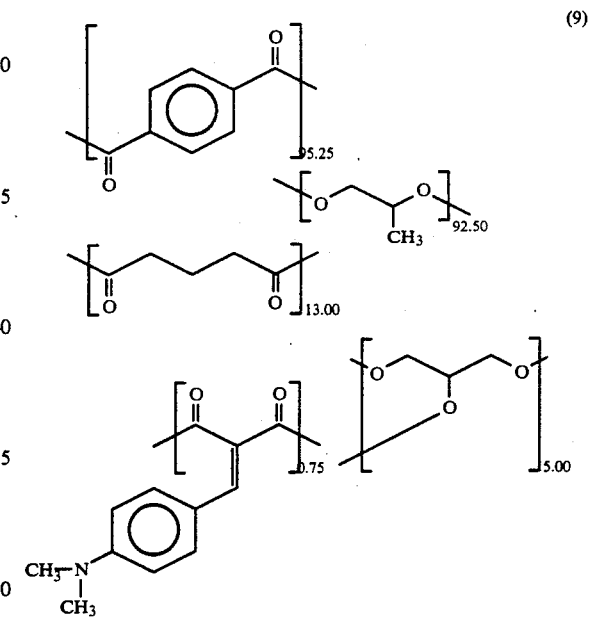

(9)

EXAMPLE 2

A mixture of 62.28 g (0.3207 mol) of dimethyl terephthalate, 7.71 g (0.04814 mol) of dimethyl glutarate, 0.89 g (0.002778 mol) of the methine compound of Formula (5) (above), 39.44 g (0.51827 mol) of 1,2-propanediol, and 1.71 g (0.01857 mol) of glycerol was placed in a polymer flask with catalytic amounts of $Zn(OAc)_2 \cdot 2H_2O$ and $Sb_2O_3$. The polymer was prepared as in the previous example except that the vacuum stage was maintained for 70 minutes. The inherent viscosity was determined to be 0.51 in methylene chloride.

The product polymer contained the following moieties.

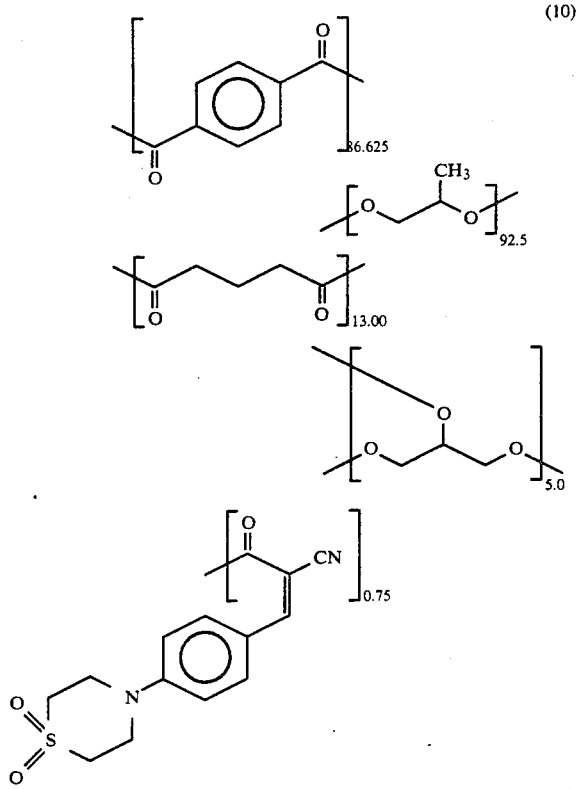

EXAMPLE 3

A mixture of 9.71 g (0.05 mol) of dimethyl terephthalate 14.57 g (0.05 mol) of the methine compound of Formula (6) (above), and 10.65 g (0.14 mol) of 1,2-propanediol was placed in a polymer flask with catalytic amounts of $Zn(OAc)_2 \cdot 2H_2O$ and $Sb_2O_3$. The polymer was prepared as in the previous examples except the vacuum stage was conducted for 1 hour. The inherent viscosity was determined to be 0.11 in methylene chloride.

The product polymer contained the following moieties.

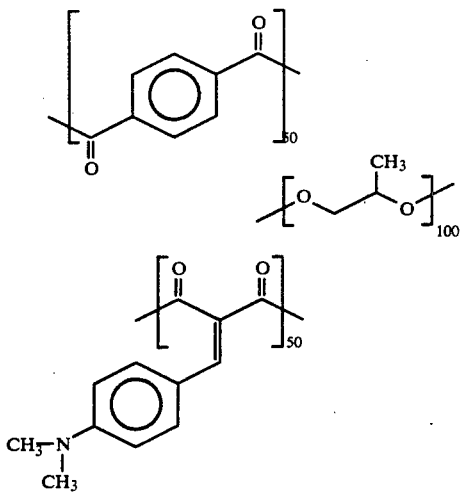

The invention has been described in detail with particular reference to preferred embodiments thereof, but it will be understood that variations and modifications can be effected within the spirit and scope of the invention.

We claim:

1. A toner composition comprising particles of amorphous thermoplastic, heat fusible, polyester resin, said resin having an inherent viscosity in the range of about 0.05 to about 0.80 in methylene chloride solution at a concentration of 0.25 grams of said polymer per 100 milliliters of said solution, a glass transition temperature in the range of about 50° to about 120° C., and a fusing point in the range of about 65° to about 200° C., said resin containing as an integral part of its backbone chain about 0.10 to about 100.0 mole ratio of ultraviolet light absorbing residues per 100 mole ratio of total acid or hydroxy monomers present in said polymer, said residues being derived from at least one methine compound that is characterized by the formula:

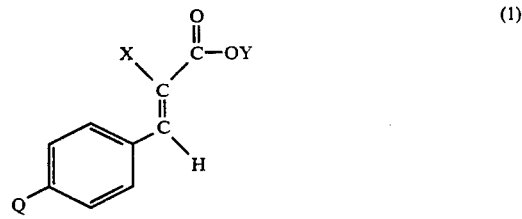

wherein:

Y is a lower alkyl radical;

X is selected from the group consisting of —CN and

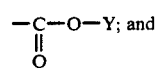

Q is selected from the group consisting of —NH₂, —NHY, —N(Y)₂, and

2. The toner composition of claim 1 wherein said particles have a size in the range of about 0.01 to about 100 microns in average diameter.

3. The toner composition of claim 2 wherein said particles have a size in the range of about 0.1 to about 30 microns in average diameter.

4. The toner composition of claim 1 wherein said particles additionally have intermixed into said polymer at least one charge control agent and at least one colorant.

5. The toner composition of claim 4 wherein the quantity of said charge control agent is in the range of about 0.05 to about 5.0 weight percent and the quantity of said colorant is in the range of about 0.5 to about 20 based on total weight of said particles.

6. The toner composition of claim 1 wherein said particles are additionally blended with a particulate charge control agent and a particulate colorant.

7. The toner composition of claim 6 wherein the quantity of said charge control agent is in the range of about 0.05 to about 5 weight percent and the quantity of said colorant is in the range of about 0.5 to about 20 weight percent based on total weight of said toner composition.

8. The toner composition of claim 1 wherein said particles are additionally blended with a particulate magnetic filler.

9. The toner composition of claim 8 wherein the quantity of said magnetic filler is in the range of about 0.5 to about 30 weight percent based on total weight of said toner composition.

10. The toner composition of claim 1 wherein said particles are dispersed in a liquid carrier having a dielectric constant that is less than about 2.5 and an electrical resistance that is greater than about $10^{10}$ ohm-centimeters volume resistivity.

11. The toner composition of claim 10 which comprises on a 100 weight percent total basis about 5 to about 50 weight percent of said particles, and about 50 to about 95 weight percent of said liquid filler.

12. The toner composition of claim 11 which additionally contains dispersed therein about 0.5 to about 5 weight percent of charge control agent and about 0.5 to about 20 weight percent of colorant.

13. The toner composition of claim 11 which additionally contains dispersed therein about 0.5 to about 30 weight percent of particulate magnetic filler.

14. The toner composition of claim 1 wherein said particles are admixed with a silicone oil or a silicone block copolymer.

15. The toner composition of claim 14 wherein the quantity of said silicone oil is in the range of about 0.5 to about 10 weight percent based on total weight of said toner composition.

16. The toner composition of claim 1 wherein said polyester polymer comprises residues derived from the polyesterification of a polymerizable monomer composition comprising:
   about 0.0/100.0 to about 99.0/1.0 mole ratio of dimethyl terephthalate based on the total acid monomers;
   about 10.0/90.0 to about 100/0.0 mole ratio of 1,2-propane diol based on the total hydroxy monomers;
   about 0.0/100.0 to about 90.0/10.0 mole ratio of additional glycol based on the total hydroxy monomers; and
   about 0.1/99.9 to about 100.0/0.0 mole ratio of at least one methine compound based on the total acid monomers.

17. The toner composition of claim 16 wherein said polymerizable monomer composition additionally contains:
   about 5.0/95.0 to about 25.0/75.0 mole ratio of dimethylglutarate based on the total acid monomers; and
   about 1.0/98.5 to about 10.0/85.0 mole ratio of glycerol based on the total hydroxy monomers.

18. The toner composition of claim 1 wherein said methine compound has the structure:

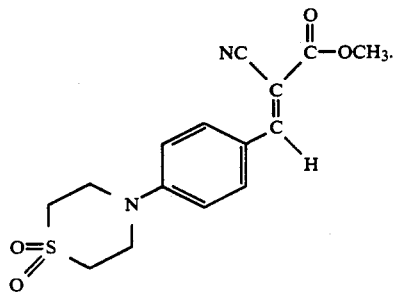

19. The toner composition of claim 1 wherein said methine compound has the structure:

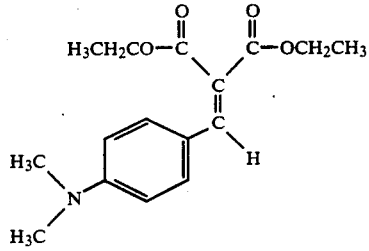

* * * * *

UNITED STATES PATENT AND TRADEMARK OFFICE
CERTIFICATE OF CORRECTION

PATENT NO. : 5,102,762

DATED : April 7, 1992

INVENTOR(S) : Tyagi et al.

It is certified that error appears in the above-identified patent and that said Letters Patent is hereby corrected as shown below:

Column 5, line 1- " 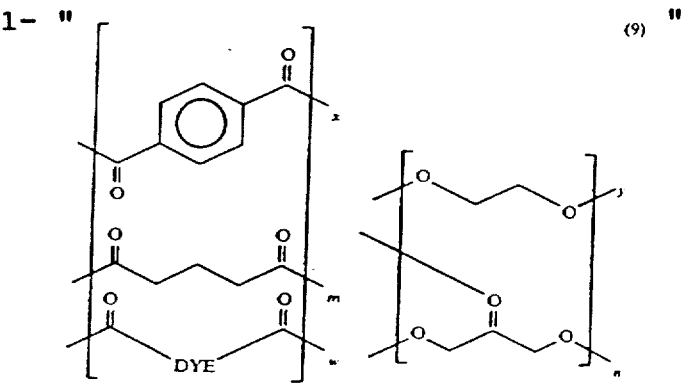 (9) "
line 15 should be

-- 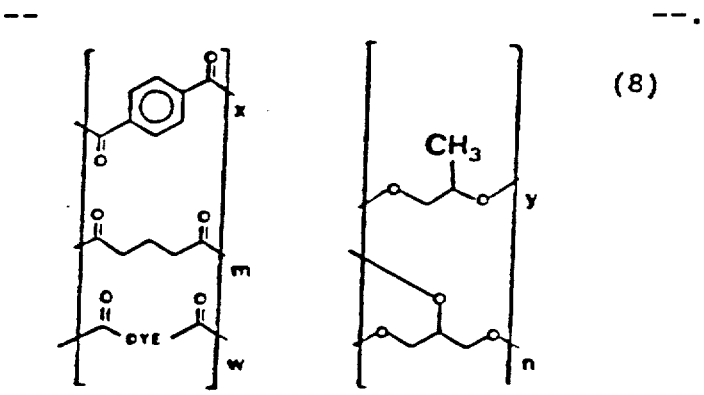 (8) --.

UNITED STATES PATENT AND TRADEMARK OFFICE
CERTIFICATE OF CORRECTION

PATENT NO.   :   5,102,762
DATED        :   April 7, 1992
INVENTOR(S)  :   Tyagi et al.

It is certified that error appears in the above-identified patent and that said Letters Patent is hereby corrected as shown below:

Column 7, line 38   "wi&:h" should be --with--.

Column 8, line 52   "duPont" should be --DuPont--.

Signed and Sealed this

Fifth Day of July, 1994

Attest:

BRUCE LEHMAN

Attesting Officer

Commissioner of Patents and Trademarks